(12) United States Patent
Lai

(10) Patent No.: US 7,426,126 B1
(45) Date of Patent: Sep. 16, 2008

(54) CHARGE APPARATUS OF AN EXTENSION CORD PLUG

(76) Inventor: Li-Chun Lai, 21F-a, No. 33, Sec. 1, Minsheng Rd., Panciao City, Taipei County (TW)

( * ) Notice: Subject to any disclaimer, the term of this patent is extended or adjusted under 35 U.S.C. 154(b) by 0 days.

(21) Appl. No.: 11/840,111

(22) Filed: Aug. 16, 2007

(51) Int. Cl.
*H02M 1/00* (2007.01)

(52) U.S. Cl. ...................................... 363/146

(58) Field of Classification Search .......... 363/16, 363/34, 146; 361/118; 307/38; 320/111
See application file for complete search history.

(56) References Cited

U.S. PATENT DOCUMENTS

| | | | | |
|---|---|---|---|---|
| 3,982,173 A | * | 9/1976 | Berry et al. ............ | 323/236 |
| 5,661,623 A | * | 8/1997 | McDonald et al. ........ | 361/42 |
| 5,894,392 A | * | 4/1999 | McDonald ............... | 361/42 |
| 5,900,804 A | * | 5/1999 | Yewell ................. | 340/425.5 |
| 6,476,523 B1 | * | 11/2002 | Lee .................... | 307/141 |
| 7,212,420 B2 | * | 5/2007 | Liao ................... | 363/146 |

* cited by examiner

*Primary Examiner*—Adolf Berhane

(57) ABSTRACT

A charge apparatus of an extension cord plug is provided. The charge apparatus is set inside an outlet and connected to an USB interface outside the outlet. When the outlet is electrified, the plug thereon is able to provide power to an electric appliance for normal operation through the USB interface after processing of the charge apparatus. By the time, the user may select demanded voltage to achieve objective of charging by various voltage sources.

9 Claims, 6 Drawing Sheets

CHARGE APPARATUS OF AN EXTENSION CORD PLUG

BACKGROUND OF THE INVENTION

1. Field of the Invention

The present invention relates to a charge apparatus of an extension cord plug. More particularly, the present invention relates to a charge apparatus with an USB charge interface outside an outlet for user to charge electronic devices.

2. Descriptions of the Related Art

Extension cord plugs are widely used with frequency, due to its character of supplying insufficient plugs at home or working place for indoor electronic devices, such as lamps that hang on the tree, or outdoor workers. Therefore, extension cord plugs are almost daily necessaries for every family.

Although the extension cord plug is practical, it can only provide plugs to alternating-current electronic devices but have no additional functions. Since the utility rate of the extension cord plug is high, the extension cord plug still needs improvement.

It can be tell that the conventional apparatus still has many drawbacks and is not good in design, thus the conventional apparatus needs improvement.

The inventor considers improvement in view of the aforementioned drawbacks of the conventional extension cord plug, and develops the present invention of charge apparatus of an extension cord plug after a long term of research.

SUMMARY OF THE INVENTION

The invention is to provide a charge apparatus inside an outlet. The charge apparatus is connected to an USB interface outside the outlet to charge a device through the USB interface.

Another, this invention is to provide a charge apparatus of an extension cord plug with different charging voltage sources that can be selected by a user to charge different devices.

A extension cord plug comprises an outlet, a charge, and an USB interface. The outlet is configured with an over current protection circuit, a filter-rectify circuit to prevent over current due to short circuit or other reasons by the over current protection circuit, and to provide a steady direct current (DC) power to the charge apparatus by the filter-rectify circuit that filters and rectifies an input AC power. The charge apparatus comprises a start-up circuit, a high-voltage snub circuit, a power tube, an over-current sampling circuit, a steady-voltage control circuit, a positive feedback circuit, a high-frequency transformer, an output filter-rectify circuit, an output voltage sampling circuit, a voltage selection switch, a photo-isolator, a load sense circuit and a load monitor. The start-up circuit receives the DC power from the filter-rectify circuit and then drives the power tube to control the output voltage of the high-frequency transformer, and senses the current flowing through the power tube by the over-current sampling circuit as well as stabilizes the voltage of the power tube by the steady-voltage control circuit. The high-frequency transformer transforms the received power into the output voltage. The high-voltage snub circuit limits an induced voltage generated by the leakage inductance of the high-frequency transformer to prevent the voltage being applied on the power tube from being too large and damaging the power tube. The positive feedback circuit controls status of the power tube according to amplitude of the primary-side current flowing through the high-frequency transformer. The output filter-rectify circuit filters and rectifies the AC power being outputted by the high-frequency transformer, and senses variation of the output voltage via the (output) voltage sampling circuit as well as transfers the sensing result to the photo-isolator. The photo-isolator then transforms the output signal into photo signal for being fed back to the input and then the photo signal is transformed into electrical signal by photo-sensor to achieve lowest-interference and high-efficiency feedback. The load sense circuit is connected to the USB interface outside the outlet to sense whether there is any load being connected to the USB interface. If there is a load, then the load monitor is driven to emit light.

These features and advantages of the present invention will be fully understood and appreciated from the following detailed description of the accompanying Drawings.

DESCRIPTION OF THE PREFERRED EMBODIMENT

Figure 1:
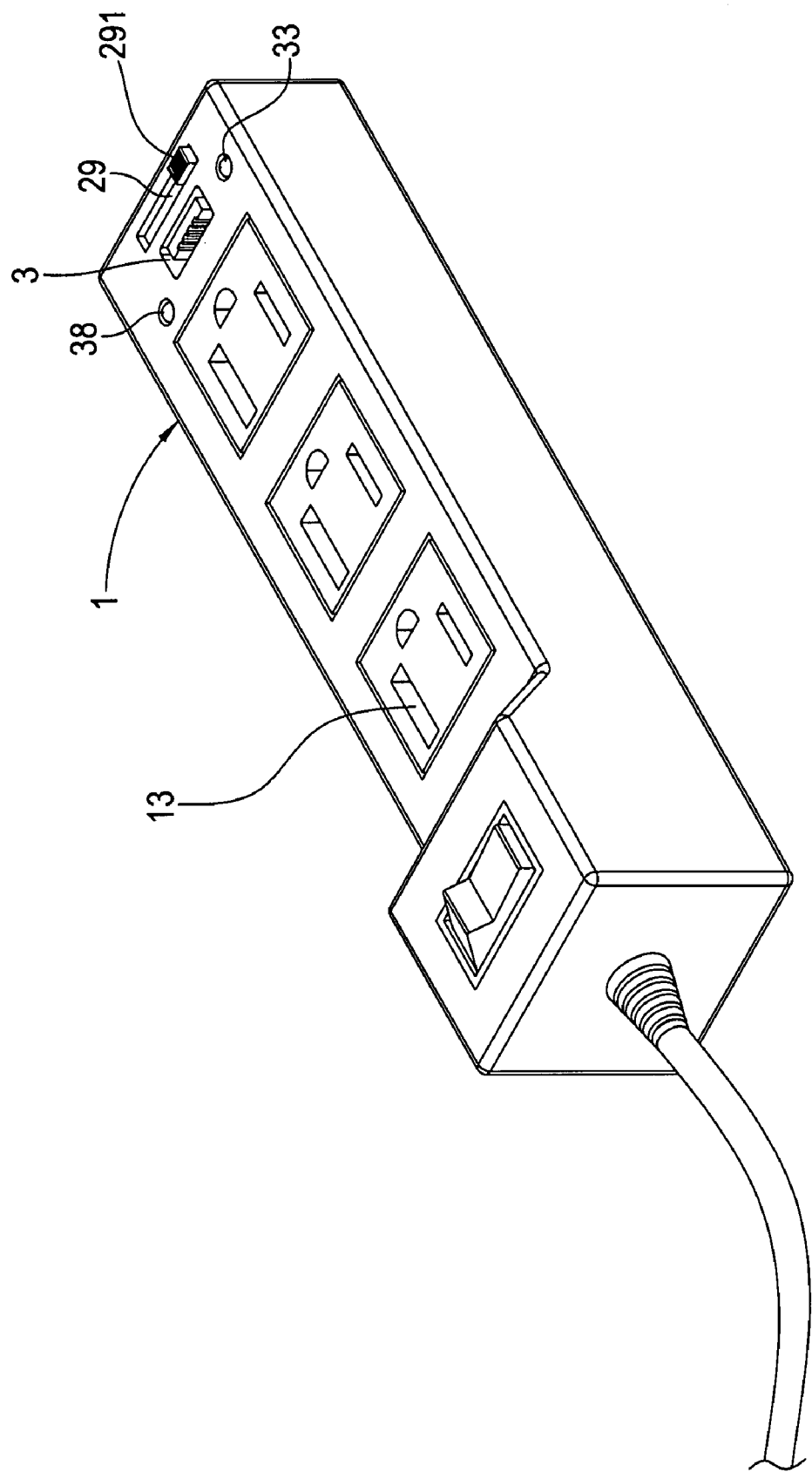
FIG. 1 is three-dimensional diagram of an extension cord plug of the present invention.
Figure 2:
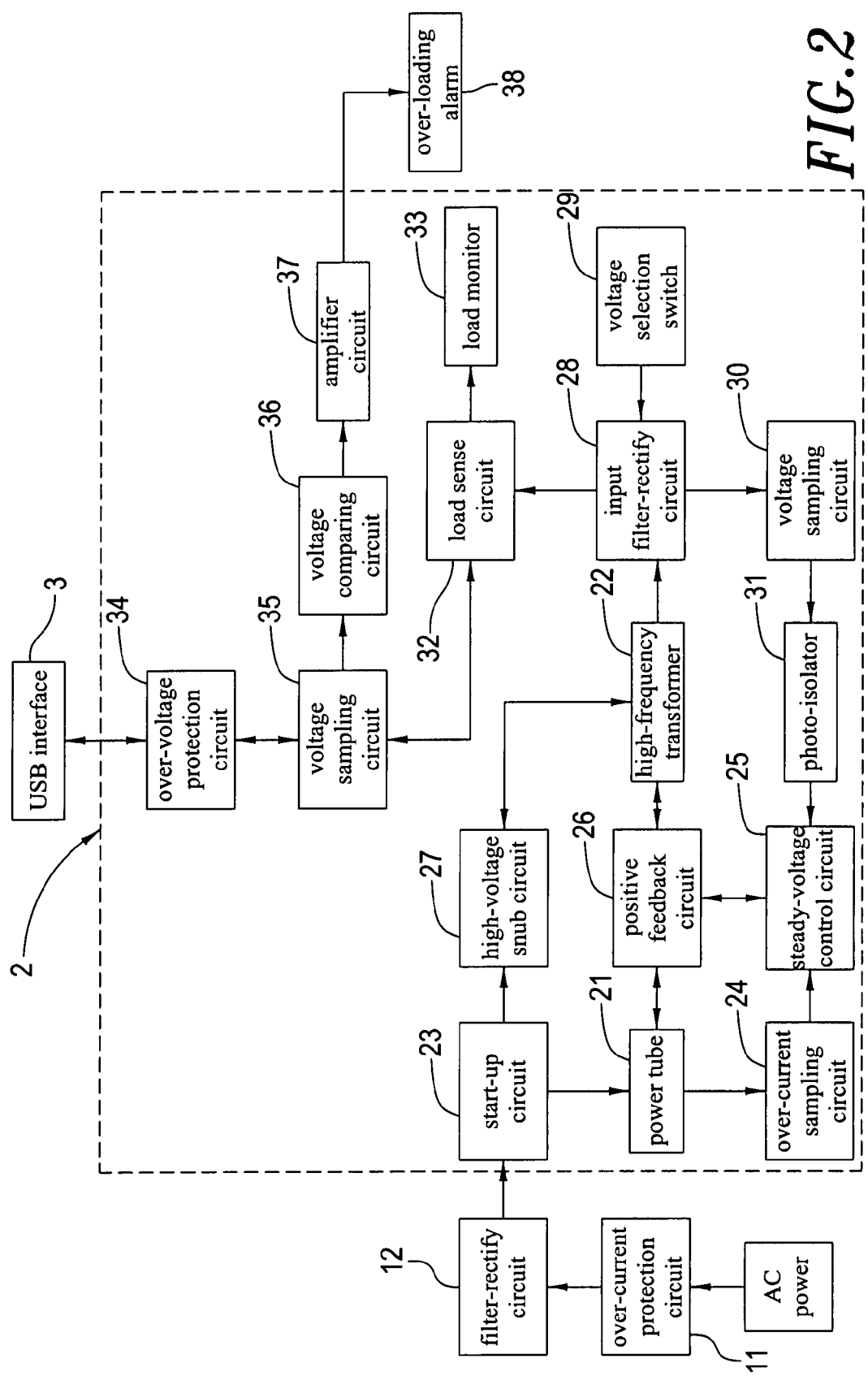
FIG. 2 is a block diagram of the extension cord plug of the present invention.
Figure 3:
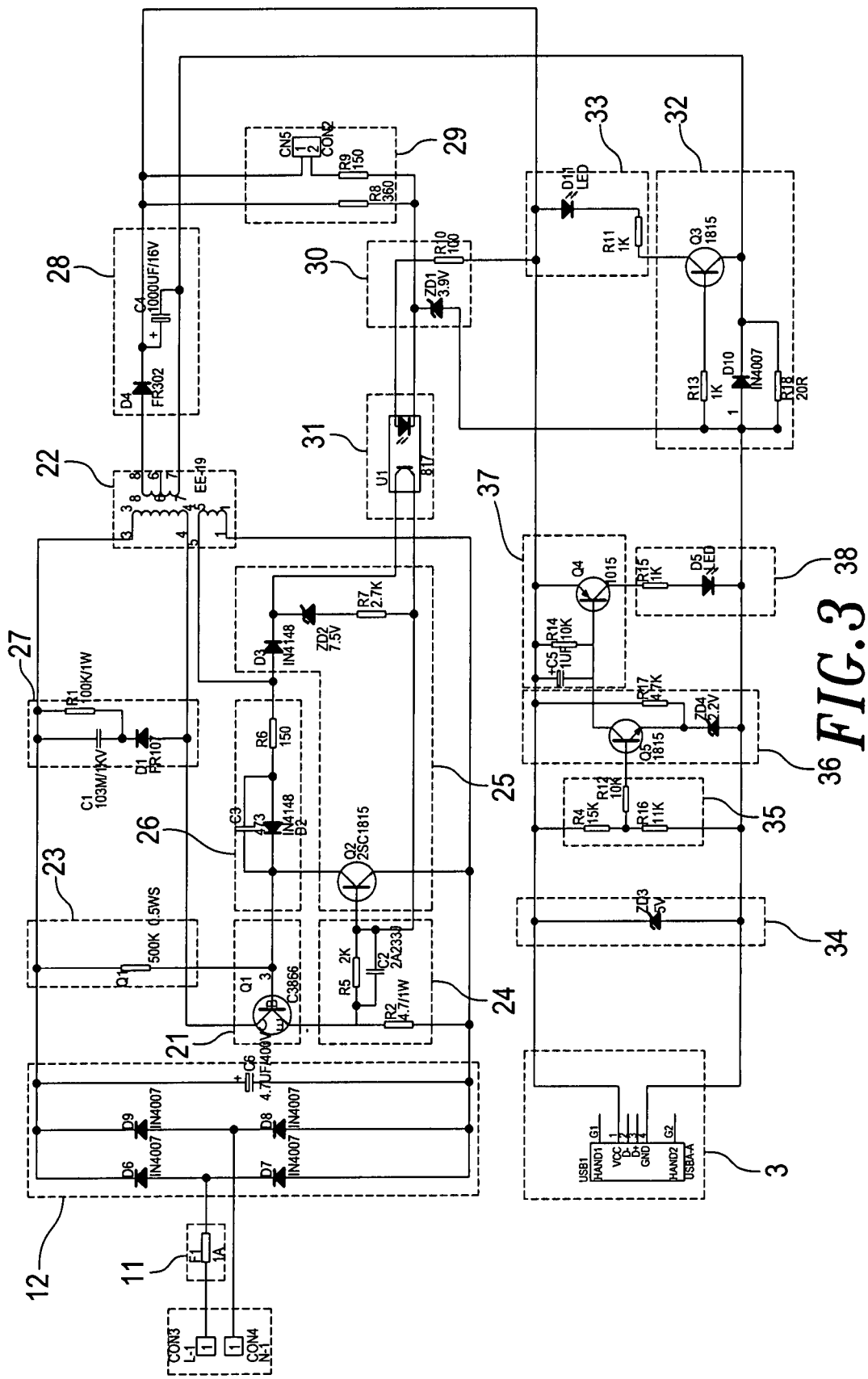
FIG. 3 is a schematic circuitry of the extension cord plug of the present invention.

Referring to FIGS. 1-3, in which the charge apparatus of an extension cord plug of the present invention is shown. An extension cord plug of the present invention mainly comprises an outlet 1, a charge apparatus 2, and an USB interface 3.

The outlet 1 is configured with a plug 13 outside the surface of the outlet 1, and internally configured with an over-current protection circuit 11 and a filter-rectify circuit 12. The over-current protection circuit 11 is configured to sense whether there is any short-circuit or abnormal status around the whole circuitry to prevent damaging the whole circuitry. The filter-rectify circuit 12 is configured to filter and rectify the inputted AC current and provide a steady DC current to a charge apparatus 2, and the over-current protection circuit 11 may be a fuse.

The USB interface 3 is outside the outlet 1 and connected to the charger 2.

The charge apparatus 2 comprises a power tube 21, a start-up circuit 23, a over-circuit sampling circuit 24, a steady-voltage control circuit 25, a high-voltage snub circuit 27, a positive feedback circuit 26, an output filter-rectify circuit 28, a voltage selection switch 29, a voltage sampling circuit 30, a load sense circuit 32, a voltage sampling circuit 35, The power tube 21 is a high-speed, high-voltage switching triode and is configured to control an output voltage of a high-frequency transformer 22.

The start-up circuit 23 is configured to drive the power tube 21 to work.

The over-sampling circuit 24 is configured to sense the current flowing through the power tube 21 and co-function with a steady-voltage control circuit 25 to prevent the current flowing through the power tube 21 from being too large to damage the power tube 21.

The steady-voltage control circuit 25 receives a sampling signal from the over-current sampling circuit 24 to control base voltage of the power tube 25.

The high-frequency transformer 22 is configured to generate various magnetic field in response to the current flowing through the primary side of the high-frequency transformer 22, then the secondary side of the high-frequency transformer 22 derives induced current and output voltage for a positive feedback circuit 26 according to the magnetic filed and the coils of the high-frequency transformer 22.

The high-voltage snub circuit 27 is configured to limit a induced voltage generated by the leakage inductance of the high-frequency transformer 22 to prevent the voltage being applied on the power tube 21 from being too large and damaging the power tube 21.

The positive feedback circuit 26 is configured to control status of the power tube 21 according to amplitude of the primary-side current flowing through the high-frequency transformer 22.

The output filter-rectify circuit 28 is configured to filter and rectify the AC power being outputted by the high-frequency transformer 22 to output a steady DC power.

The voltage selection switch 29 has a multi-voltage selection button 291, and is configured to transmit the selection to the output filter-rectify circuit 28 to make the output filter-rectify circuit 28 output demanded DC voltage according to the selection.

The voltage sampling circuit 30 is configured to sense variation of the output voltage, and transmit the sense result to a photo-isolator 31.

The photo-isolator 31 is configured to receive the sampling signal from the voltage sampling circuit 30, transform the sampling signal into photo signal, and then the photo signal is transformed into electrical signal by photo-sensor and the electrical signal is transmitted to the steady-voltage control circuit 25 for controlling the high-frequency transformer 22 to output demanded voltage via controlling the power tube 21 by the positive feedback circuit 26 to achieve high-efficiency feedback.

The load sense circuit 32 is configured to receive the direct power of the output filter-rectify circuit 28 and be connected to the USB interface 3 to check whether there is any load being connected to the USB interface 3, in which once there is load, the load sense circuit 32 then drive a load monitor 33 to present the status, and the load monitor 33 may be a LED or other luminous source.

The voltage sampling circuit 35 is connected to the load sense circuit 32 and configured to retrieve a voltage signal from the voltage sampling circuit 35, and transmit the voltage signal to a voltage comparing circuit 36. If the comparing result denotes abnormal, the signal would be amplified by an amplifier circuit 37 for driving an over-loading alarm 38 to notify the user that load of the USB interface is over-loading. Meanwhile, an over-voltage protection circuit 34 is activated to protect the load from being damaged. Besides, the over-loading alarm 38 can be a luminary or a buzzer to alarm by flashing or buzzing respectively.

Figure 4:
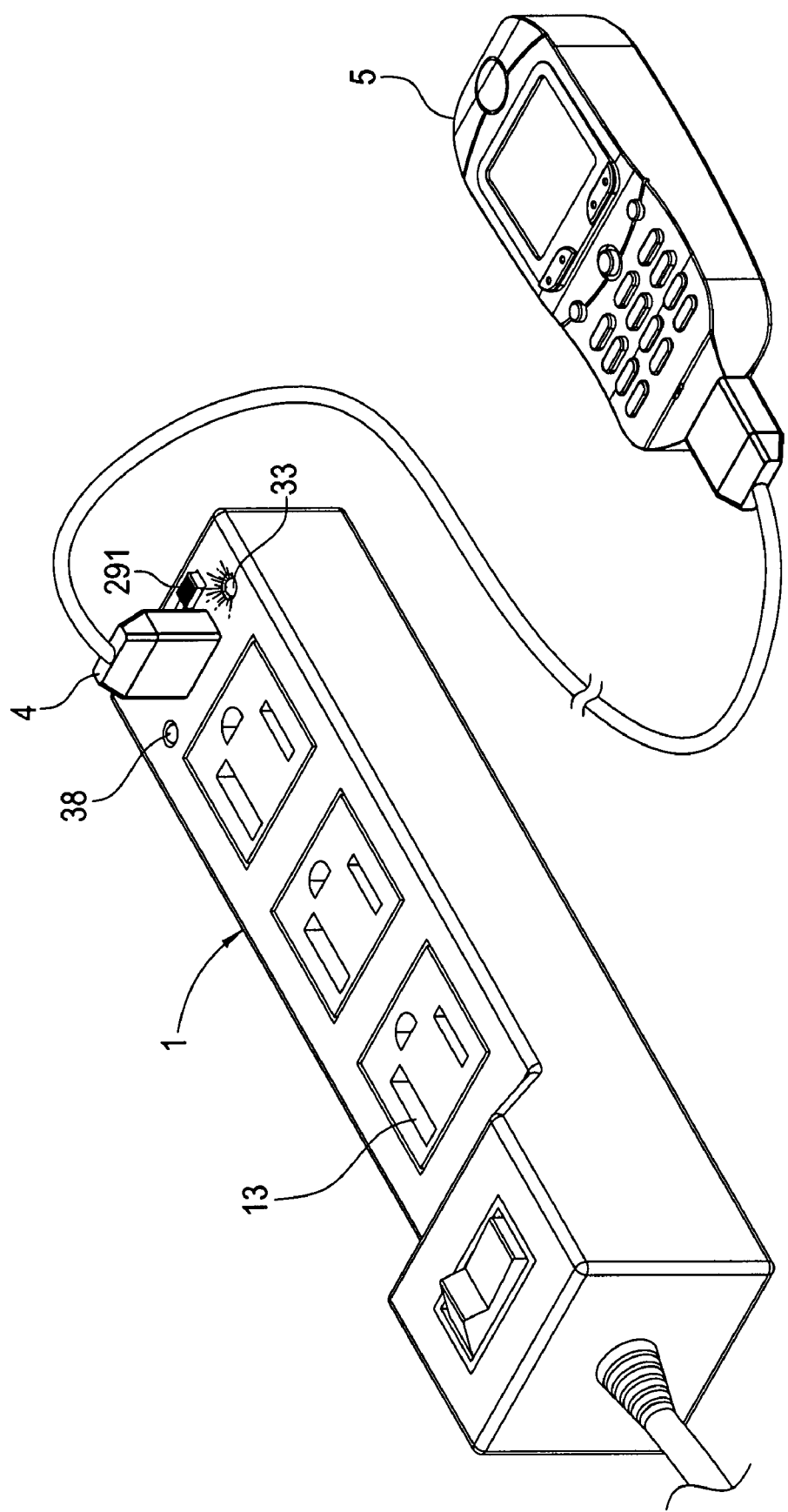
FIG. 4 is an embodiment of the extension cord plug of the present invention.

Referring to FIG. 4, which shows an embodiment of the present invention, when the outlet 1 is electrified, the plug 13 thereon is able to provide power to an electric appliance for normal operation. The USB interface 3 on the outlet 1 is able to provide connection to an USB connector 4 for charging a battery or other electric appliance needed to be charged. By the time, the user may select demanded voltage via the multi-voltage selection button 291 of the voltage selection switch 29, and tell the charging status by demonstration of the load monitor 33.

Figure 5:
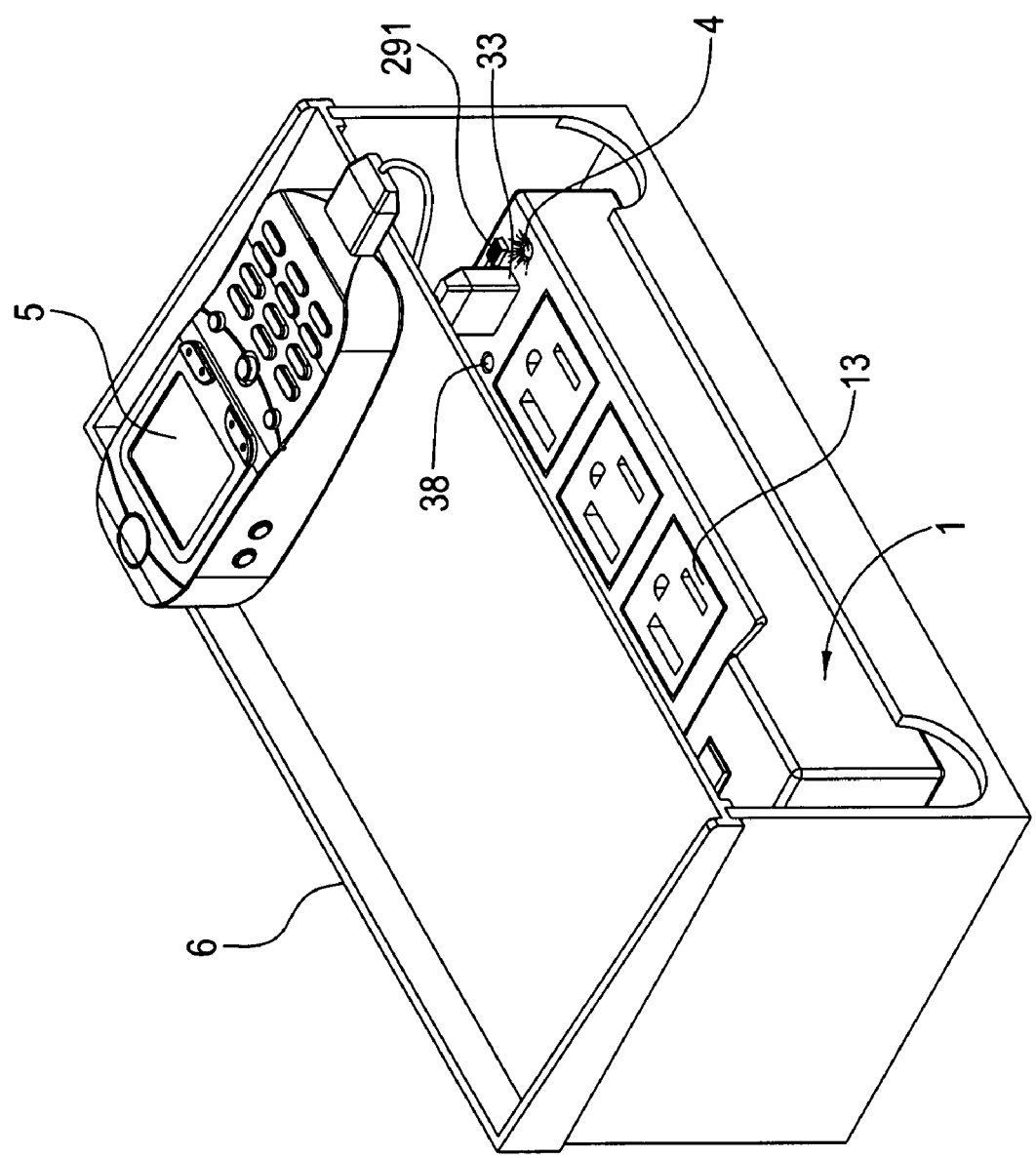
FIG. 5 is another embodiment of the extension cord plug of the present invention.

Referring to FIG. 5, which shows another embodiment of the present invention, the outlet 1 is set inside a chest 6 or a box for containing the outlet 1 with artistic effect. Moreover, an electric appliance needed to be charged can be placed on the chest 6 or the box for convenience.

Figure 6:
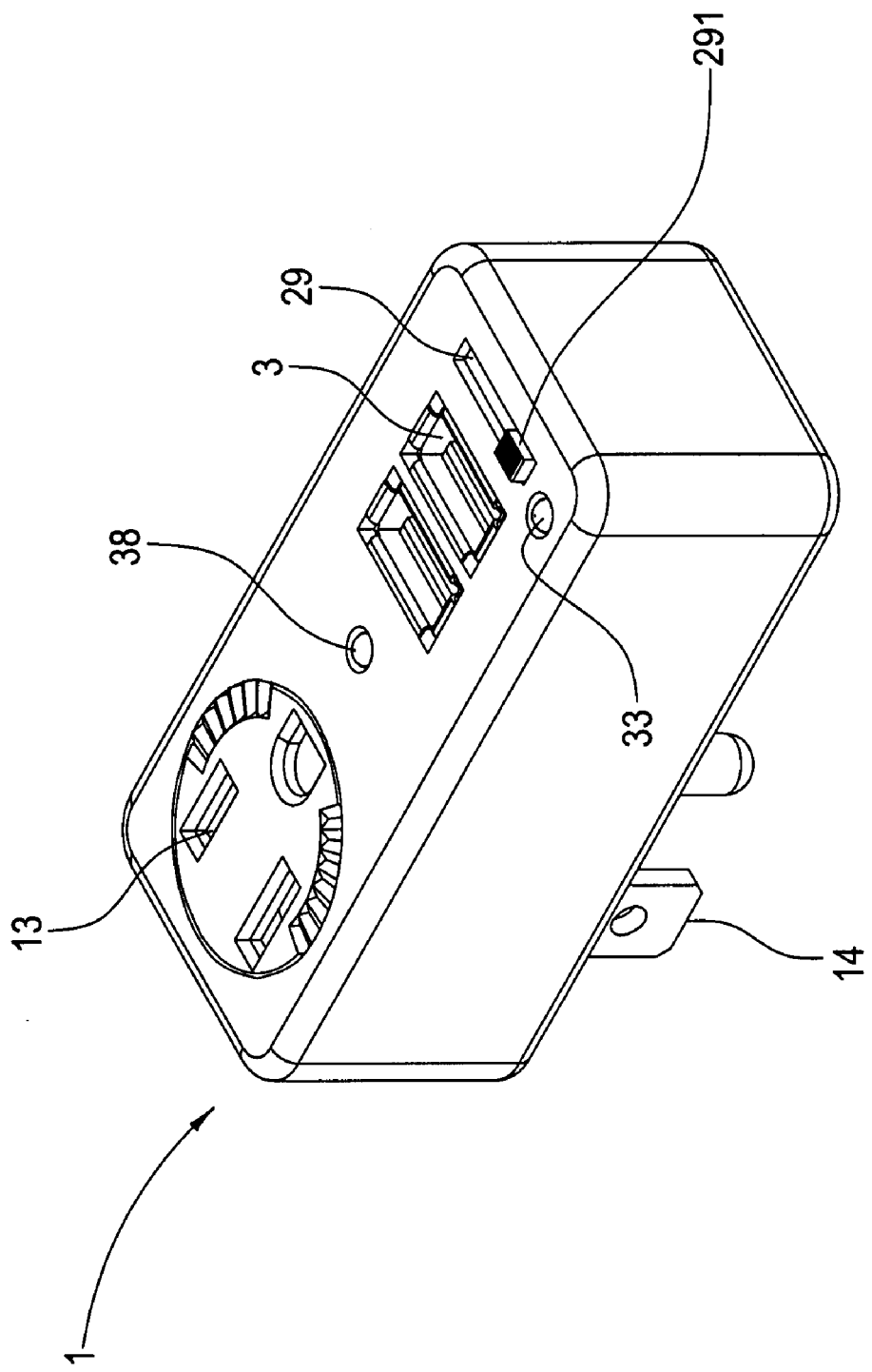
FIG. 6 is another embodiment of the extension cord plug of the present invention.

Referring to FIG. 6, which shows another embodiment of the present invention, a pin 14 is directly set on the outlet 1 to induce AC power to the plug 13 and induce DC power to the USB interface 3.

Further, referring to prior arts, the extension cord plug of the present invention has at least the advantages as following:

1. The present invention brings up a charge apparatus inside the outlet, and the charge apparatus is connected to an USB interface outside the outlet to charge an electric appliance by the USB interface.

2. The present invention is able to provide various charging voltages for the user to voluntarily select to charge different electric appliances by different voltages.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An extension cord plug comprising:
an outlet, being configured with an over-current protection circuit and a filter-rectify circuit, the over-current protection circuit being configured to sense the whole circuitry, the filter-rectify circuit beings configured to filter and rectify the inputted AC current and provide a steady DC current to a charge apparatus; and
an USB interface outside the outlet and being connected to the charge apparatus;
the charge apparatus, comprising:
  a power tube being configured to control an output voltage of a high-frequency transformer;
  a start-up circuit being configured to drive the power tube to work;
an over-current sampling circuit being configured to sense the current flowing through the power tube to prevent the power tube from being damaged;
  a steady-voltage control circuit being configured to receive a sampling signal from the over-current sampling circuit to control a voltage of the power tube;
  the high-frequency transformer being configured to generate induced current and output voltage for a positive feedback circuit;
  the positive feedback circuit being configured to control a working status of the power tube according to an amplitude of the primary-side current flowing through the high-frequency transformer;
  an output filter-rectify circuit being configured to filter and rectify an AC power being outputted by the high-frequency transformer to output a steady DC power;
  a voltage sampling circuit being configured to sense variation of the output voltage;
  a photo-isolator being configured to receive a sampling signal from the voltage sampling circuit, transform the sampling signal into a photo signal for being transformed into an electrical signal and the electrical signal being transmitted to the steady-voltage control circuit; and
  a load sense circuit being configured to receive the DC power of the output filter-rectify circuit and being connected to the USB interface to check whether there is any load being connected to the USB interface, in which once there is load, the load sense circuit then drives a load monitor to present the status.

2. The extension cord plug as claimed in claim 1, wherein the power tube is a high-speed and high-voltage switching triode.

3. The extension cord plug as claimed in claim 1, further comprising a high-voltage snub circuit being configured to limit an induced voltage generated by the leakage inductance of the high-frequency transformer to prevent the voltage being applied on the power tube from being too large and damaging the power tube.

4. The extension cord plug as claimed in claim 1, further comprising a voltage selection switch having a multi-voltage selection button, and being configured to transmit the selection to the output filter-rectify circuit to make the output filter-rectify circuit output demanded DC voltage according to the selection.

5. The extension cord plug as claimed in claim 1, wherein the high-frequency transformer is configured to generate various magnetic field in response to the current flowing through the primary side of the high-frequency transformer, then the secondary side of the high-frequency transformer derives induced current and output voltage for the positive feedback circuit according to the magnetic filed and the coils of the high-frequency transformer.

6. The extension cord plug as claimed in claim 1, wherein the load monitor is a LED or other luminous source.

7. The extension cord plug as claimed in claim 1, wherein the outlet is configured to be contained in a chest or a box, and an electric appliance needed to be charged is placed on the chest or the box.

8. The extension cord plug as claimed in claim 1, further comprising a voltage sampling circuit, wherein the voltage sampling circuit is connected to the load sense circuit and configured to retrieve a voltage signal from the voltage sampling circuit, and transmit the voltage signal to a voltage comparing circuit; when the comparing result denotes abnormal, the signal is amplified by an amplifier circuit for driving an over-loading alarm to alarm, and an over-voltage protection circuit is activated to protect the load from being damaged.

9. The extension cord plug as claimed in claim 8, wherein the over-loading alarm is a luminary or a buzzer to alarm by flashing or buzzing respectively.

* * * * *